United States Patent [19]

Nishizawa et al.

[11] Patent Number: 4,869,610
[45] Date of Patent: Sep. 26, 1989

[54] CARRIAGE CONTROL SYSTEM FOR PRINTER

[75] Inventors: Katsuhiko Nishizawa; Yuji Takano, both of Suwa, Japan

[73] Assignee: Seiko Epson Corporation, Tokyo, Japan

[21] Appl. No.: 311,375

[22] Filed: Feb. 16, 1989

Related U.S. Application Data

[63] Continuation of Ser. No. 22,442, Mar. 5, 1987.

[30] Foreign Application Priority Data

Mar. 7, 1986 [JP] Japan ................................ 61-49751

[51] Int. Cl.[4] ............................................. B41J 19/30
[52] U.S. Cl. ...................................... 400/322; 318/685; 318/696; 400/279; 400/903
[58] Field of Search ................... 400/279, 322, 903; 318/685, 696

[56] References Cited

U.S. PATENT DOCUMENTS

| | | | |
|---|---|---|---|
| 3,942,619 | 3/1976 | Nordstrom | 400/903 X |
| 4,203,678 | 5/1980 | Nordstrom | 400/903 X |
| 4,282,471 | 8/1981 | Budniak | 318/696 X |
| 4,429,268 | 1/1984 | Yajima | 318/685 X |
| 4,477,757 | 10/1984 | Palombo | 318/685 X |
| 4,536,691 | 8/1985 | Sakakibara | 318/685 X |
| 4,602,882 | 7/1986 | Akazawa | 400/903 X |
| 4,648,026 | 3/1987 | Petrick | 318/685 X |
| 4,658,194 | 4/1987 | Richter | 318/696 |

OTHER PUBLICATIONS

*IBM Tech. Disc. Bulletin*, by G. Goldrian, vol. 24, No. 8, Jan. 1982, pp. 4274–4276, 400-903.
*IBM Tech. Disc. Bulletin*, by J. Barnett, vol. 22, No. 10, Mar. 1980, pp. 4494–4498, 400-903.
*IBM Tech. Disc. Bulletin*, by M. Skelton, vol. 23, No. 2, Jul. 1980, pp. 439–440, 400-903.
*IBM Tech. Disc. Bulletin*, by H. Louis, vol. 24, No. 1A, Jun 1981, pp. 121–124, 400-903.

*Primary Examiner*—Paul T. Sewell
*Attorney, Agent, or Firm*—Blum Kaplan

[57] ABSTRACT

A carriage control system for a printer which effects printing by moving the carriage mounted on a print head to reduce the distance on either side of the printing area required for acceleration and deceleration. Various approaches to rapidly and accurately accelerating carriage to a selected constant speed and then decelerating the carriage from the constant speed to a stop are provided. Both open-loop and closed-loop control approaches are utilized.

19 Claims, 19 Drawing Sheets

| CARRIAGE | STEP NO. | PHASE A | PHASE B | PHASE C | PHASE D |
|---|---|---|---|---|---|
| CLOCKWISE | 1 | ON | OFF | ON | OFF |
|  | 2 | ON | OFF | OFF | ON |
|  | 3 | OFF | ON | OFF | ON |
|  | 4 | OFF | ON | ON | OFF |
| COUNTER-CLOCKWISE | 1 | ON | OFF | OFF | ON |
|  | 2 | ON | OFF | ON | OFF |
|  | 3 | OFF | ON | ON | OFF |
|  | 4 | OFF | ON | OFF | OF |

| PREDETERMINED TIME \ SPEED | N1 PPS | N2 PPS | N3 PPS |
|---|---|---|---|
| tD1 | 4 (ms) | 5 | 6 |
| tD2 | 3 | 4 | 5 |
| tD3 | 2 | 3 | 4 |
| tD4 | 1.9 | 2 | 3 |
| tD5 | 1.8 | 1.9 | 2.9 |
| tD6 | 1.7 | 1.8 | 2.8 |
| tD7 | 1.6 | 1.7 | 2.7 |
| tD8 | 1.5 | 1.6 | 2.6 |
| tD9 | 1.4 | 1.5 | 2.5 |
| tD10 | 1.3 | 1.4 | 2.4 |
| tD11 | 1.2 | 1.4 | 2.3 |
| tD12 | 1.2 | 1.4 | 2.3 |
| TX | 0.2 | 0.3 | — |
| TY | 0.4 | 0.6 | — |
| TB | — | — | 0.5 |

FIG. 9

| SPEED / ΔT | N1 PPS | N2 PPS | N3 PPS |
|---|---|---|---|
| ΔT1 | 0.2 | 0.2 | 0.5 |
| ΔT2 | 0.2 | 0.2 | 0.5 |
| ΔT3 | 0.3 | 0.3 | 0.6 |
| ΔT4 | 0.4 | 0.4 | 0.6 |
| ΔT5 | 0.5 | 0.6 | 0.8 |
| ΔT6 | 0.6 | 0.8 | 0.9 |
| ΔT7 | 1.0 | 1.2 | 1.2 |
| ΔT8 | 2.0 | 2.5 | 1.5 |
| ΔT9 | 2.5 | 3.0 | 1.8 |
| ΔT10 | 3.0 | 3.5 | 1.8 |
| ΔT11 | 3.5 | 3.5 | 2.0 |
| ΔT12 | 3.5 | 3.5 | 2.5 |

FIG. 12

| PREDETERMINED TIME \ SPEED | N1 PPS | N2 PPS | N3 PPS |
|---|---|---|---|
| tD 1 | 1.0 (ms) | 1.5 | 2.5 |
| tD 2 | 1.0 | 1.5 | 2.5 |
| tD 3 | 1.0 | 1.5 | 2.5 |
| tD 4 | 1.5 | 1.8 | 3.0 |
| tD 5 | 1.5 | 1.8 | 3.0 |
| tD 6 | 1.5 | 2.0 | 3.0 |
| tD 7 | 1.5 | 2.0 | 3.5 |
| tD 8 | 1.0 | 2.0 | 3.5 |
| tD 9 | 2.0 | 3.0 | 3.5 |
| tD 10 | 3.0 | 3.0 | 4.0 |
| tD 11 | 3.0 | 3.5 | 4.0 |
| tD 12 | 3.0 | 3.5 | 4.0 |

FIG. 13

CARRIAGE CONTROL SYSTEM FOR PRINTER

This is a Continuation of Application Ser. No. 07/022,442 filed on Mar. 5, 1987.

BACKGROUND OF THE INVENTION

The invention is generally directed to a carriage control system for an impact or a non-impact serial-type printer, such a serial dot printer and in particular to a small high efficiency printer which enables optimum speed control outside of the print area to minimize the distance required outside of the print area for acceleration and deceleration and thus minimize the printer width.

Various methods for controlling the carriage of a serial-type printer have been suggested. However, each of these methods suffers from the disadvantage of requiring wide spaces on both sides of the printing area for acceleration and deceleration of the carriage. This results in a printer having a total width significantly wider than the print area and increases the overall width of the printer.

Accordingly, there is a need for a small printer with a high efficiency carriage control system which optimizes speed control outside of the print area by minimizing the carriage acceleration and deceleration distances to provide a narrower and more compact printer.

SUMMARY OF THE INVENTION

The invention is generally directed to a carriage control system for a printer which effects printing by moving a print head mounted on the carriage. The carriage control system includes a step motor for driving the carriage, a mechanism for generating a phase change instruction to supply the step motor with a phase change instruction and means for outputting a motor timing signal in synchronism with a step movement of the step motor. During the acceleration phase of carriage movement three different control methods may be used. The first is appropriate for rapid acceleration and uses maximum torque. The second acceleration control method is useful for speed overshoot during acceleration where torque must be reduced. The third control method is useful when the selected constant speed (printing speed) is low and there is significant overshoot acceleration. The three acceleration control methods are combined to optimize acceleration. Constant speed is maintained by a control method and there are three deceleration methods. One is designed to bring the carriage to a stopped position and the other two slow the carriage down so it may be stopped by the first deceleration control method.

Accordingly, it is an object of the invention to provide an improved carriage control system for a printer.

Another object of the invention is to provide an improved carriage control system for a printer which minimizes the space required outside of the printing area for acceleration and deceleration of the carriage to aid in miniaturizing the printer.

Another object of the invention is to provide a carriage control system for a printer which utilizes open and closed loop control circuits.

A further object of the invention is to provide an improved carriage acceleration control system which is capable of acceleration with maximum torque and rapidly correcting overshoot velocity.

Yet another object of the invention is to provide an improved carriage deceleration control system with variable degrees of braking to rapidly stop the carriage without causing the step motor to step out.

Still other objects and advantages of the invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 9 is a table showing acceleration patterns in accordance with a first acceleration control method;

FIGS. 12 and 13 are tables showing deceleration data patterns in accordance with the invention;

DETAILED DESCRIPTION OF THE PREFERRED EMBODIMENTS

Figure 1:
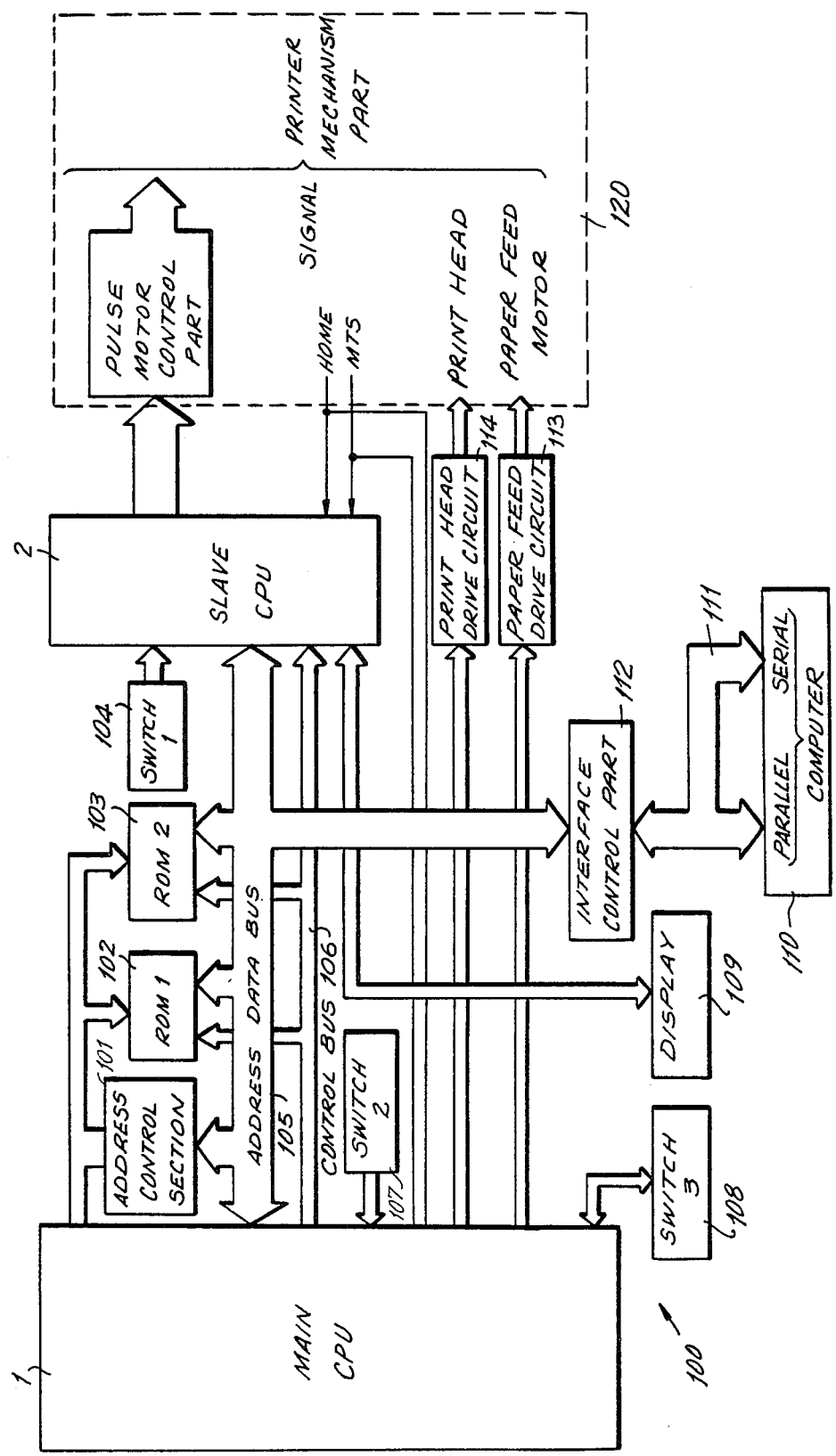
FIG. 1 is a block diagram of a printer control circuit in accordance with the invention.
Figure 2:
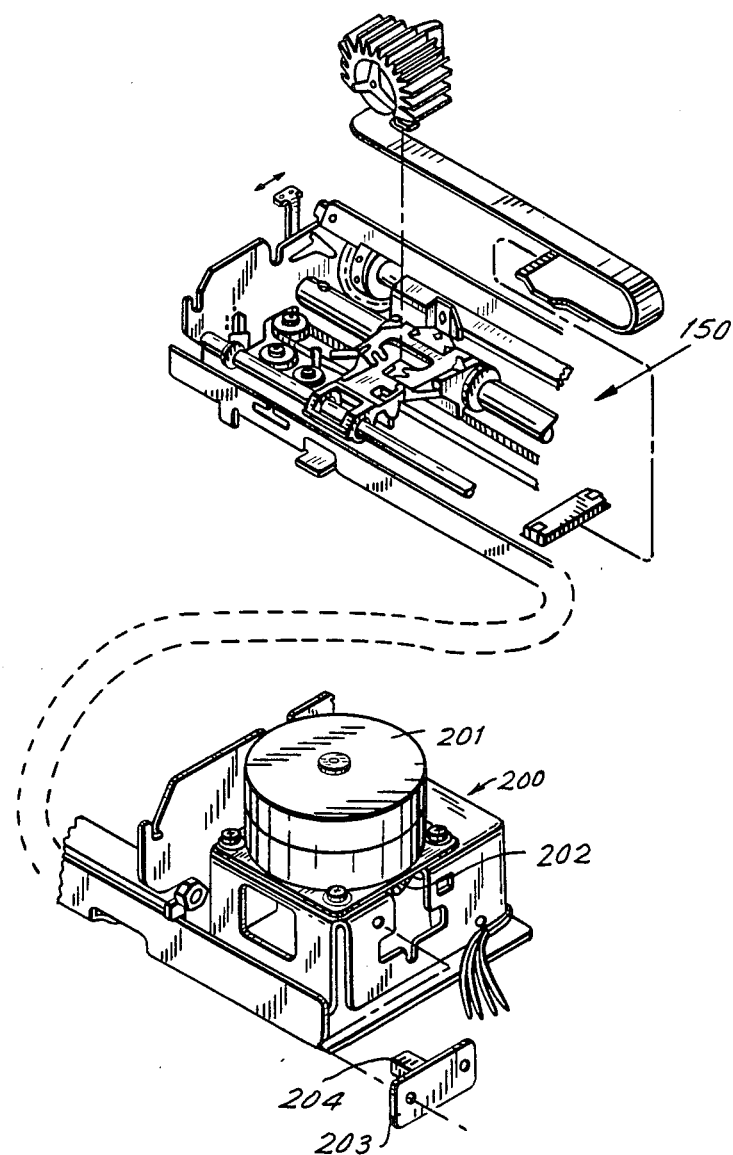
FIG. 2 is a partially cut away and exploded perspective view of a carriage mechanism and carriage control portion in accordance with invention.

Reference is made to FIGS. 1 and 2 wherein a block diagram of a control circuit and a carriage mechanism in accordance with a preferred embodiment of a printer, generally indicated as 100 is depicted. FIG. 1 shows in block diagram form printer 100 including a main central processing unit (hereinafter "CPU") 1 which exerts overall control over the printer and a slave CPU 2 under the control of main CPU 1 which is dedicated to controlling the step motor which drives the carriage supporting the print head. Printer 100 includes an address control section 101, first and second ROMs 102, 103, a first switch 104 coupled to slave CPU 2, an address data bus 105 and a control bus 106. A second switch 107 and third switch 108 are coupled to main CPU 1. A display 109 is also coupled to slave CPU 2. A computer 110 having parallel and/or serial inputs is coupled to address data bus 105 through a bus 111 and interface controller 112. The printer also includes a mechanical portion shown generally as 120 including a pulse motor control section, a print head and a paper feed motor. Mechanical portion 120 also generates HOME and MTS signals which are transmitted to both slave CPU 2 and main CPU 1. A paper feed drive circuit 113 and print head drive circuit 114 drive the paper feed motor and print head.

FIG. 2 depicts a carriage mechanism, generally indicated as 150 and an encoder mechanism, generally indicated as 200. Encoder 200 includes a slit plate 202 and a motor timing signal detecting base plate 203 with a transmission-type photosensor 204. Encoder 200 in association with a step motor 201 generates a motor timing signal (hereinafter referred to as "MTS") in synchronism with the rotation of step motor 201. A closed-loop control is achieved by directly connecting the motor shaft of step motor 201 to encoder 200 with the resolution corresponding to the number of steps of the motor in a one-to-one correspondence. The speed of rotation of step motor 201, which corresponds directly to the speed of the carriage is selectively set by means of software in accordance with a selected print mode. Many printers are capable of printing at a variety of speeds which requires the carriage to move at different speeds.

Figure 3:
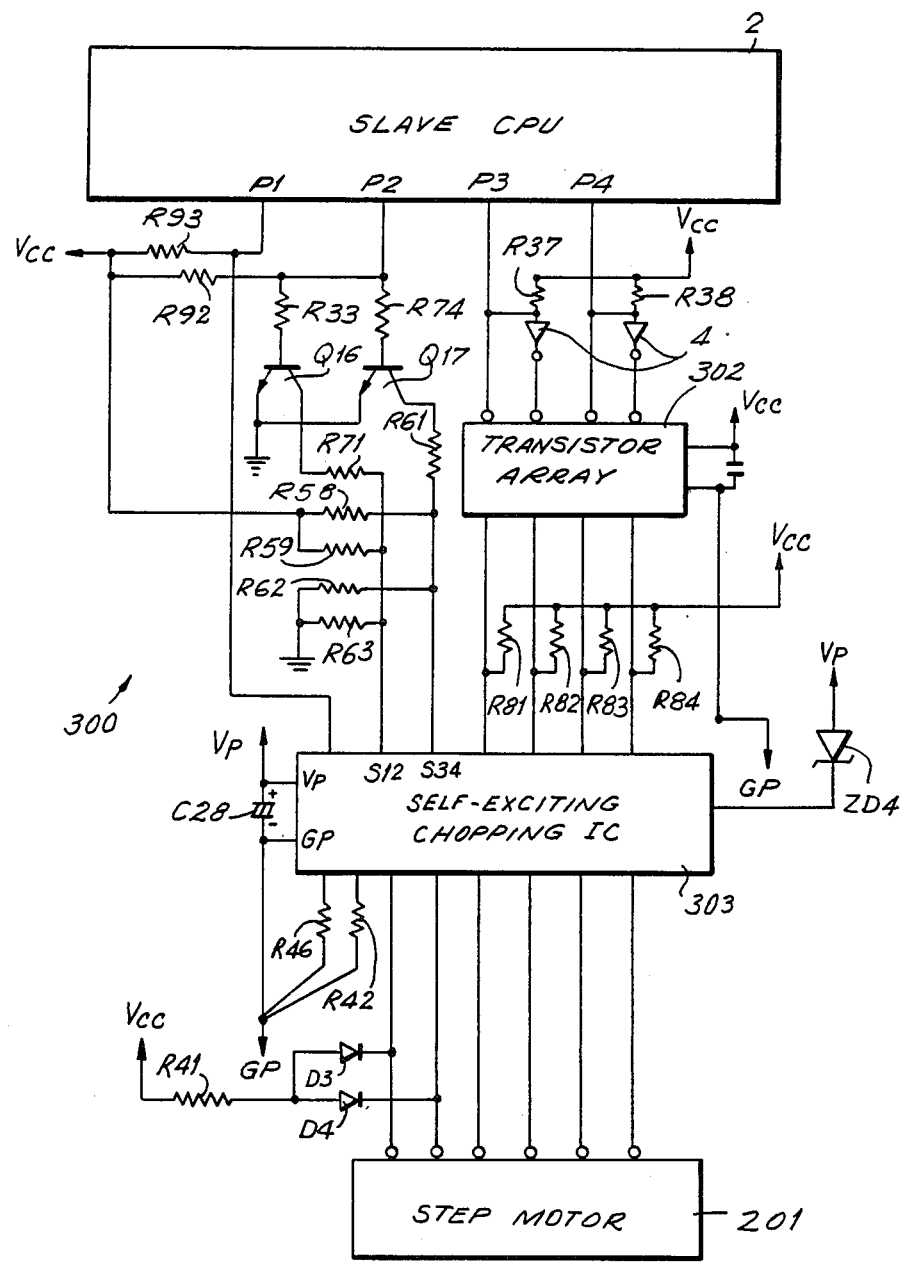
FIG. 3 is a circuit diagram of a carriage motor control circuit in accordance with a preferred embodiment of the invention.

Reference is next made to FIG. 3 where a carriage motor control circuit, generally indicated as 300 is depicted. The carriage motor control circuit includes slave CPU 2 a transistor array 302 and a self-excited chopping IC 303. Slave CPU 2 has 4 ports P1, P2, P3 and P4. Port P1 is coupled to self-excited chopping IC 303 through a resistor R93. Port P2 is coupled to terminals S12 and S34 through a transistor resistor network including transistors Q16 and Q17 and resistors R74, R33, R92, R71, R61, R58, R59, R62 and R63. Ports P3 and P4 of slave CPU 2 are coupled to 4 inputs of self-excited chopping IC 303 through transistor array 302. A phase change signal is output from output lines P3 and P4 of slave CPU 2 representative of the signals for phases A and C. Inverters 4, biased by resistors R37 and R38 invert the control signals for phases A and B to produce signals C and D. The effect is that phases A and B have inverted statuses with each other and phases C and D have the same relationship. The control signals for phases A, B, C and D are input into transistor array 302. The output of transistor array 302 is fed into four input terminals on self-excited chopping IC 303 through biasing resistors R81, R82, R83 and R84. A Zener Diode ZD4 is coupled between voltage $V_P$ and self-excited chopping IC 303.

Figures 4A, 4B:
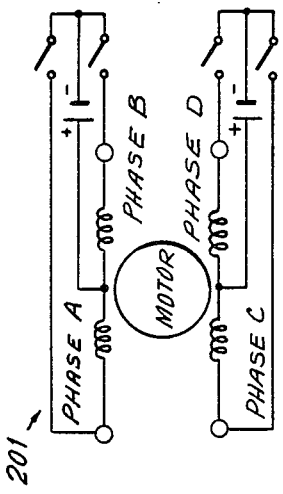
FIG. 4A is a table showing step motor drive sequences in accordance with an embodiment of the invention.
FIG. 4B is a schematic representation of the circuit connections for driving a step motor in accordance with a preferred embodiment of the invention.

Reference is made to FIG. 3 wherein the control signal for step motor 201 is output from slave CPU 2 at ports P3 and P4 and received by transistor array 302. Step motor 201 is driven by self-excited chopping IC 303 which produces constant current. Step motor 201 is actuated with a two-two phase excitation in the order of steps 1, 2, 3 and 4 shown in FIG. 4A. FIG. 4B shows the manner in which the phases of motor 201 are oriented. When the appropriate phase step sequence is applied to step motor 201, step motor 201 rotates either clockwise or counter clockwise.

Figure 5:
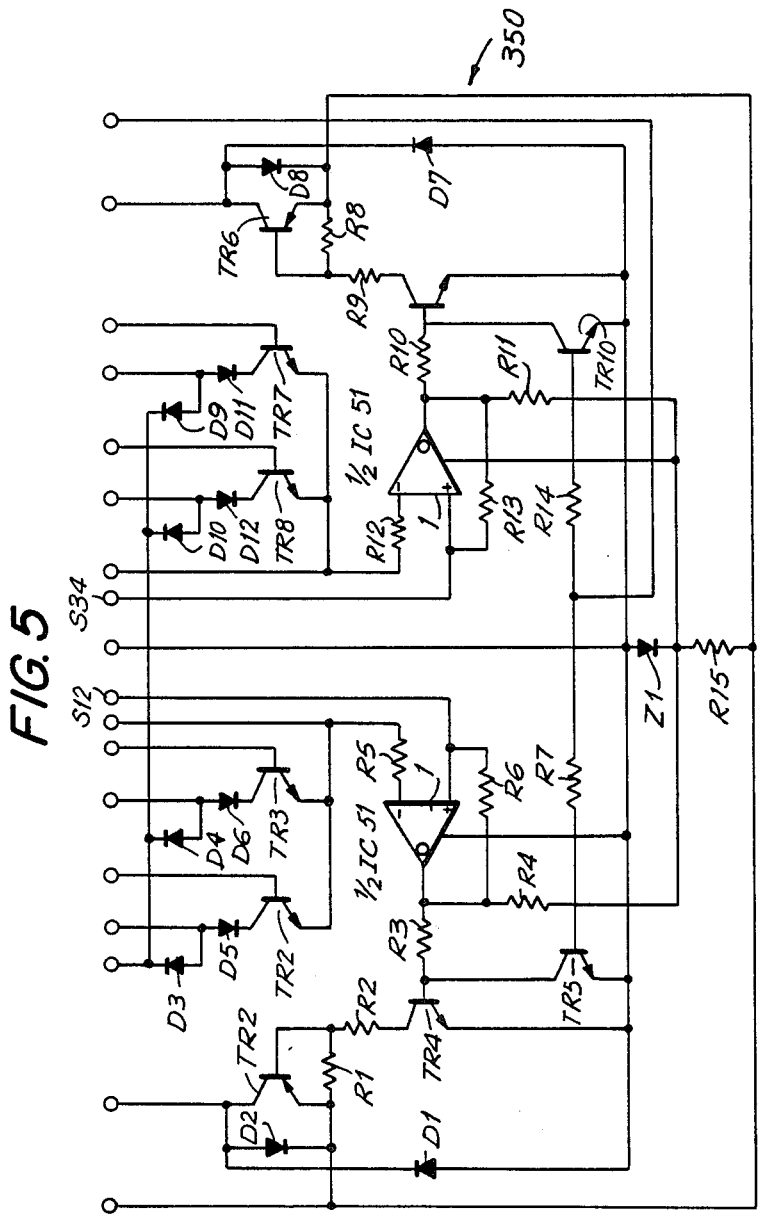
FIG. 5 is a circuit diagram of a step motor drive circuit in accordance with a preferred embodiment of the invention.

FIG. 3 depicts the carriage motor control circuit 300 and FIG. 5 depicts drive circuit 350. The power supplied to step motor 201 is detected by current detecting resistors R46 and R42 connected to terminals EAB and ECD of self-excited chopping IC 303. The power is controlled in relation to the reference voltages at input terminals S12 and S34 at the two halves of IC 51 separately depicted in FIG. 5 for purposes of clarity. The reference voltage is changed depending upon the selected speed. Therefore, when one speed is fixed, the reference voltage is controlled by the effective resistance of resistors R58 and R62 (and R59 and R63) and port 1 of slave CPU 2. When another speed is selected, the reference voltage is controlled by the effective resistance values of resistors R58, R62 and R61 (and R59, R63 and R71) and port P2 of slave CPU 2. A counter electromotive force, which is generated after energization for phase change of the step motor is dissipated through diodes D3, D4, D10, D9 of FIG. 5 and a Zener Diode ZD4 shown in FIG. 3. In addition, while the carriage is stopped, a Hold current is applied to a coil in step motor 201 from a voltage $V_{cc}$ through resistor R41 and diodes D3 and D4. The Hold state is controlled by the output ports of slave CPU 2.

The drive circuit 350 shown in FIG. 5 operates in a conventional manner well known in the art and include resistors R1–R15, diodes D1–D12, transistors TR1–TR10, Zener Diode Z1 and the two comparators which make up IC 51.

A description of the manner in which the control circuit operates follows. To control the step motor 201 in a stable and accurate manner a closed-loop control system using step motor 201 and encoder 200 for speed detection is used. The control circuit itself is shown in FIG. 3.

Different types of control of the step motor are required to control the step motor at constant speed, to accelerate and to decelerate. The different types of speed control are selected by software controls dependent upon a predetermined period for the phase change and the MTS. The carriage accelerates from a stopped position to preselected speed printing is performed in the printing area and the carriage is decelerated to a stop after the printing area.

Figure 6:
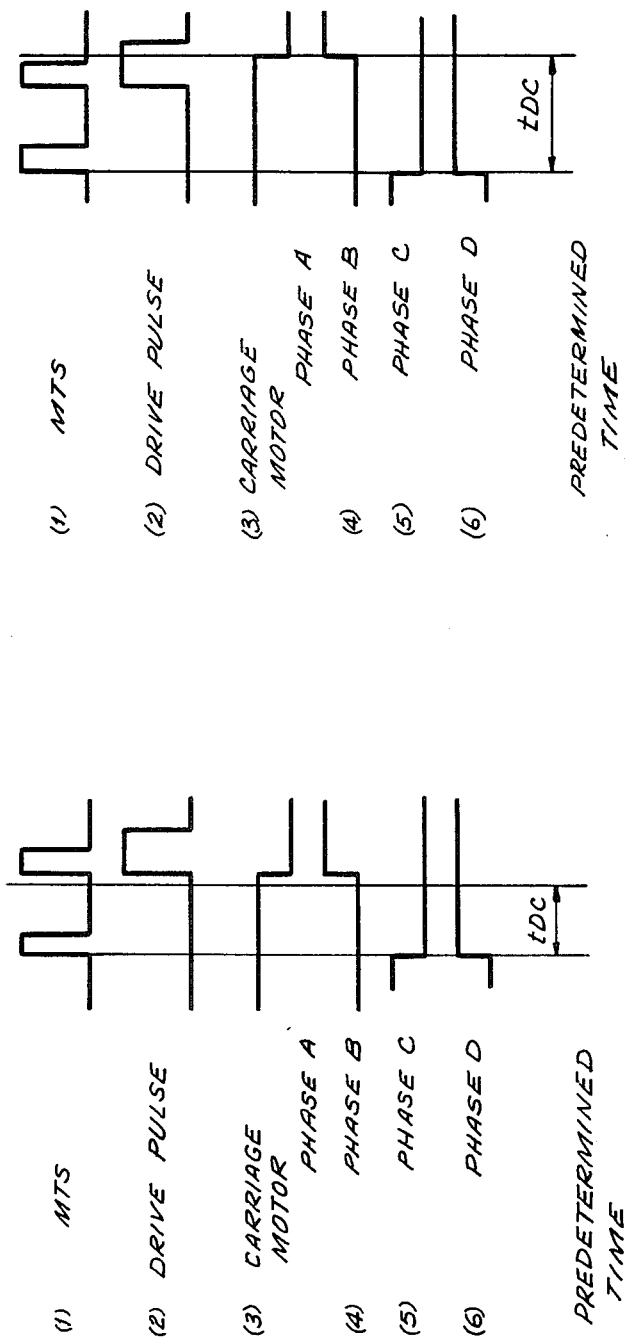
FIG. 6A graphically shows the relationship between various signals in the carriage control system when the MTS period is longer than the predetermined period tDC.
FIG. 6B graphically shows the relationship between various signals in the carriage control system when the MTS period is shorter than the predetermined period tDC.

Reference is made to FIGS. 6A and 6B wherein timing diagrams of various signals are shown for a constant speed control situation. When the constant speed control is present and the interval between adjacent MTS signals is longer than the predetermined time period tDC, the phase changes on the step motor when MTS rises (FIG. 6A). On the other hand, when the interval between adjacent MTS signals is less than the predetermined time, the phase is changed after the predetermined time as elapsed (FIG. 6B). The positional relationship between the MTS and the rotor of step motor 201 is determined by the positional adjustment between slit plate 202 and transmission-type photosensor 204. The positional relationship is adjusted to achieve the smallest torque change on the static torque curve of step motor 201 at each phase change and thus provide maximum torque.

Acceleration Control (1) The first acceleration control approach is particularly effective in quickly accelerating the carriage. The phase is changed at the later of the MTS or an acceleration time delay data tDn (where n is an integer from 1 to 12) shown in FIG. 9. As shown in the block diagram of FIG. 14, when a speed command Nm pps (pulses per second) (where m is an integer from 1 to 3) is received by slave CPU 2, the phase of step motor 201 is changed by a phase change circuit 50. At the same time, slave CPU 2 allows an interrupt timer 53 to begin running. Interrupt timer 53 operates under the control of a phase change period data table 52 (hereinafter referred to as a "tD table") of the type shown in FIG. 9. The appropriate entry in the tD table of FIG. 9 is found by selecting the appropriate column based on the value of m. The tD table shows the timing for an acceleration sequence up to the selected speed. This provides the predetermined time period which is compared with the MTS. The next phase change again occurs with the later of the interrupt from timer 53, which is the predetermined time period tDn and the MTS interrupt from encoder 200. This operation is repeated n times (in the example, n equals 12 which corresponds to an acceleration sequence from a stopped position to the first dot in twelve phase changes).

In accordance with the above operation, when the speed of the step motor is low relative to the selected speed, the torque is increased, and when the speed is high relative to a selected speed, the torque is decreased. This uses the feature of a step motor that the torque is generated in the form of a sine curve with the rotation angle acting as a variable relative to the excited phase. As a result, torque corresponding to the speed can be obtained.

Figure 15:
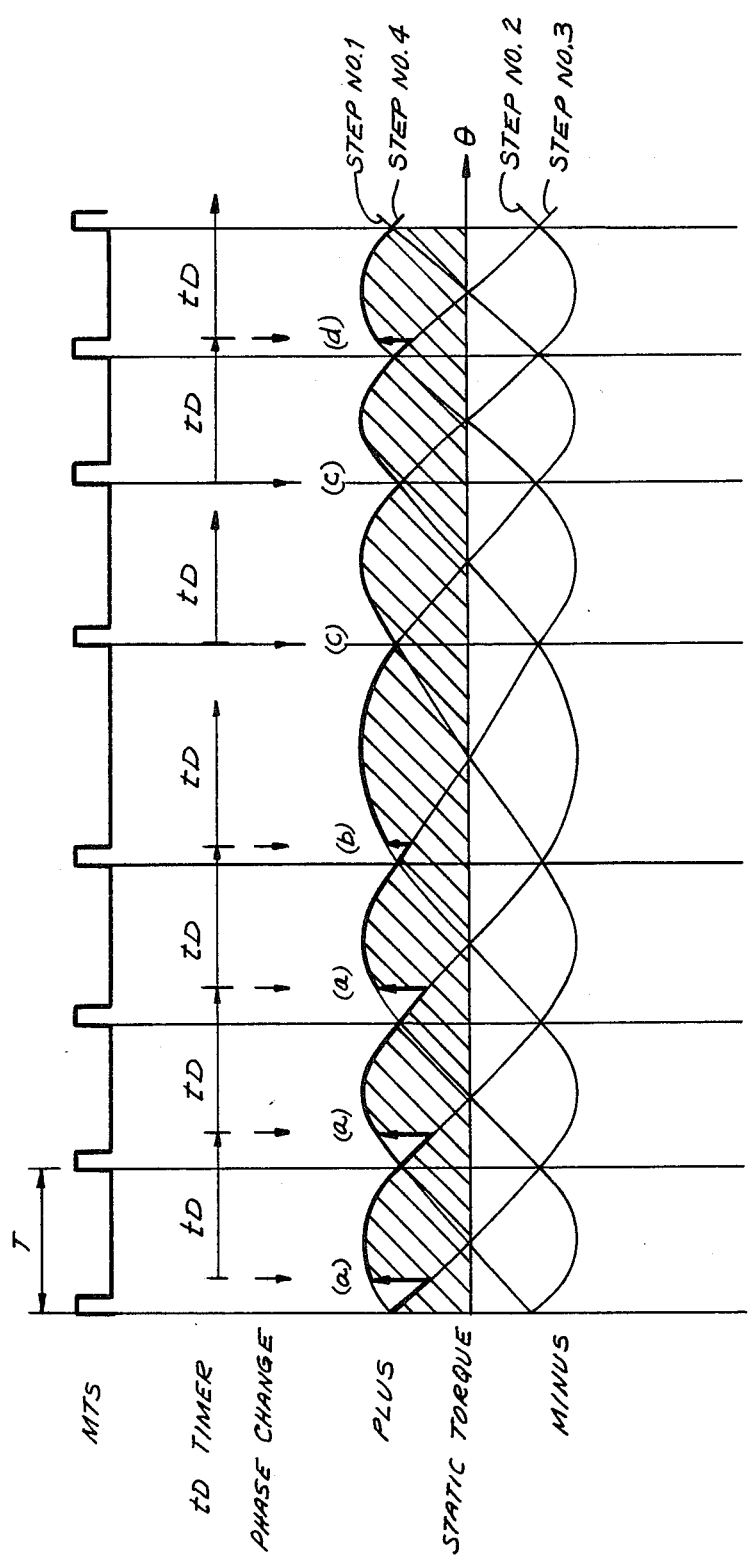
FIGS. 15–17 are timing diagrams showing the relationship between phase changes, timing and torque.

FIG. 15 shows a case where the speed of the step motor is too high and its speed must be slowed down (an overshoot condition). As a result, the speed is reduced and a MTS period T, which corresponds to the actual speed of the step motor, is made longer than the timer value tD. As shown in FIG. 15, relatively more torque can be obtained at point (b) than at point (a) (where the hatched portion indicates the relative degree of torque). At points (a) the phase change is dependent upon the predetermined time tD. At points (b) and (c) the change in phase is dependent upon the MTS signal. At this state the speed is being reduced. At points (c), the torque developed is equal to the trace envelopes of the torque curves. Finally, at point (d) the speed is again increasing and the phase change is driven by the predetermined time tD sequence instead of the MTS interrupt.

Figure 16:
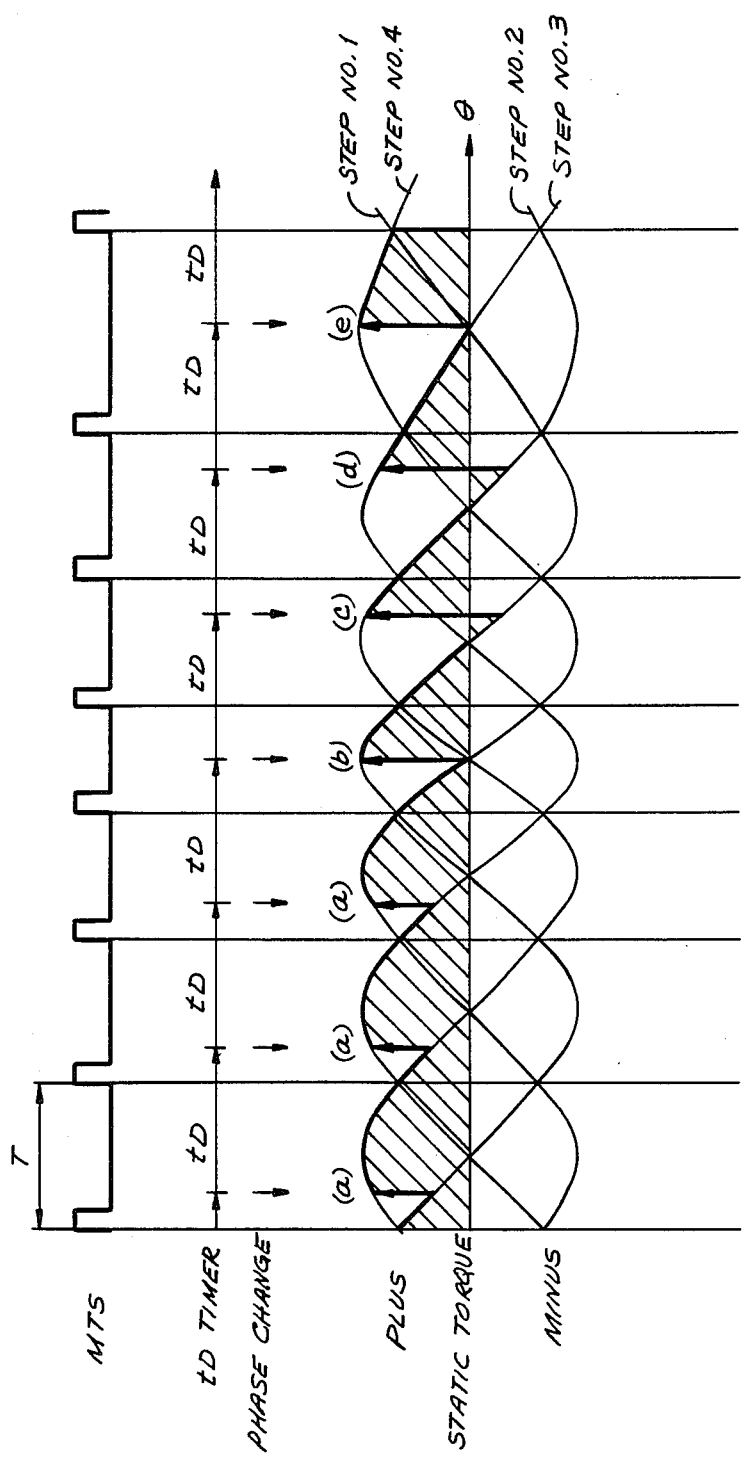

Reference is next made to FIG. 16 wherein a situation which the speed of the step motor is so high that it is difficult to easily decrease the speed to a selected speed value. As the MTS period T becomes shorter and shorter relative to interrupt timer value tD, the phase change repeatedly occurs when the timer interrupt tD is received. This results in a decrease in the torque moving from points (a)–(e).

(2) As described above, when the speed is too low, rapid acceleration is achieved by providing maximum acceleration torque. However, when the speed is too high, the motor only achieves a small reduction in torque with control method (1), thus requiring many steps to return to the selected speed.

Figure 7:
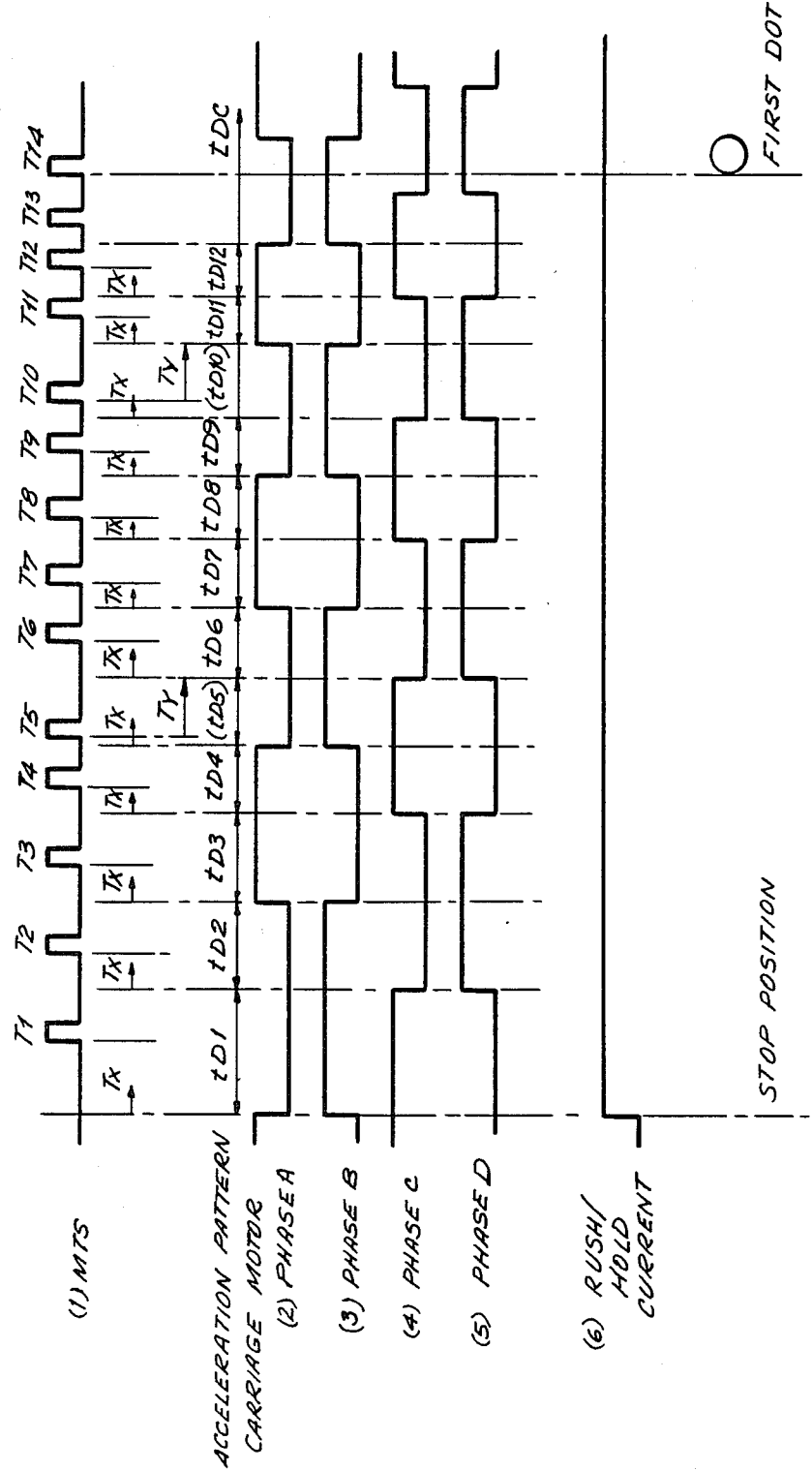
FIG. 7 is a timing diagram showing the relationship between various signals during the acceleration of a step motor in accordance with an acceleration control method.

Accordingly, a different control method is used to solve this overshoot problem. First, to determine if the speed of the step motor is too high, the MTS is checked during a predetermined time Tx (as shown in FIGS. 7 and as set by the predetermined time column of FIG. 9), starting at the beginning of each of the tD time periods. This is shown in FIG. 7 where at the beginning of each of time periods tD1–tD12, short time period Tx is compared against the beginning of the MTS signals T1–T12. CPU 2 monitors when time Tx elapses by setting interrupt timer to Tx at the beginning of each tD period. When CPU 2 detects that the MTS has occurred during time period Tx, CPU 2 sets interrupt timer 53 equal to time period Ty (FIG. 9) instead of the remainder of time tD. This event is shown in FIG. 7 for time periods tD5 and tD10. As seen, the MTS for time periods 5 and 10 falls within short time period Tx at the very beginning of time periods tD5 and tD10. Thus, as soon as the MTS signal is received, time period Ty is used to set the interrupt timer and when time Ty elapses the phase is changed. The Ty interrupt occurs later than the tD interrupt so the torque can be further decreased.

If the second type of control is repeated, the speed will continue decreasing at a greater rate than with the first acceleration control approach. Therefore, after this control arrangement is performed, it is disabled from occurring again within a predetermined time (number of cycles). Further, the values of Tx and Ty corresponding to each of the speeds Nm pps are stored in tD table 52 (see FIG. 9). Then, when the MTS is generated during time period Tx, CPU 2 sets interrupt timer 53 to Ty. The second control method, using time periods Tx and Ty, is in constant operation (except for the predetermined period after it is used) when the carriage control system is accelerating the carriage from its stopped position as shown at the left of FIG. 7 to the point where the first dot is printed at the right of FIG. 7.

Figure 8:
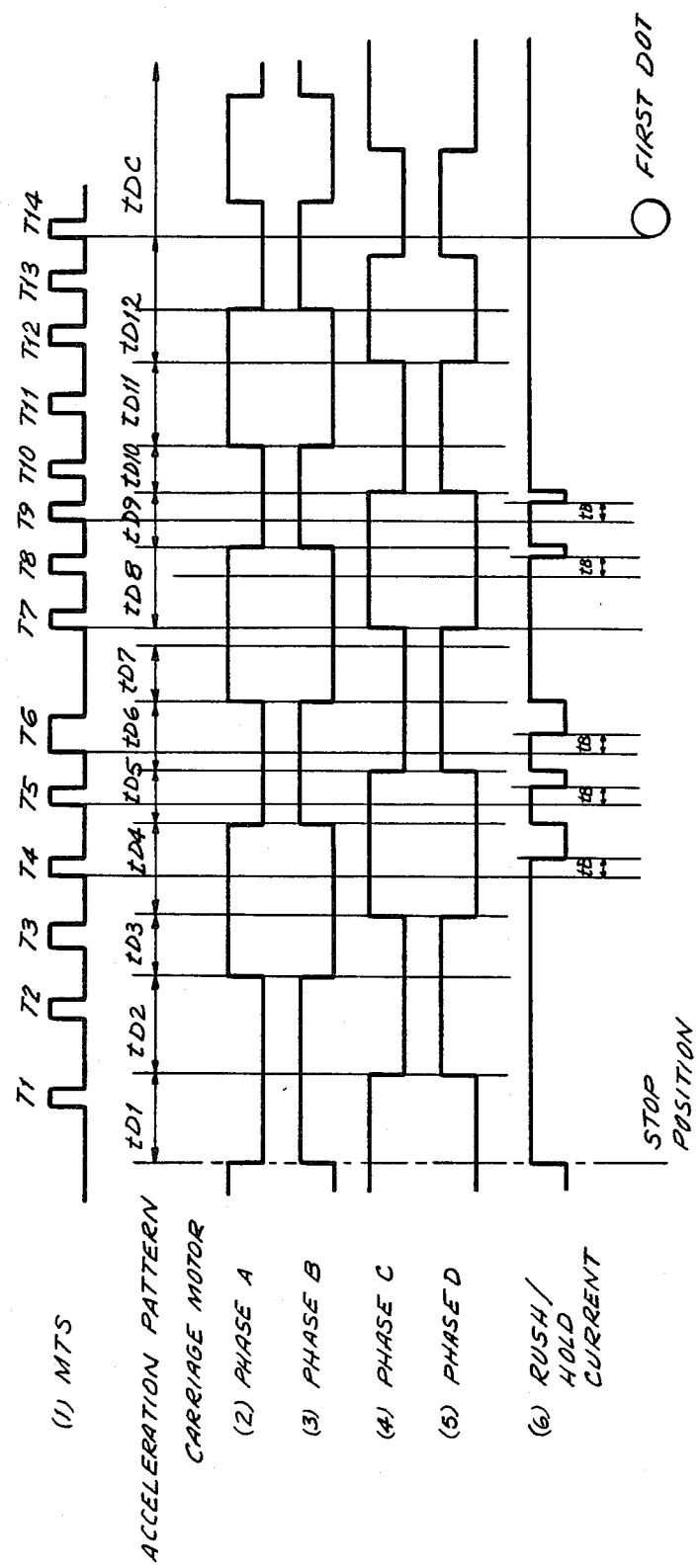
FIG. 8 is a timing diagram showing the relationship between various signals during acceleration of a step motor in accordance with another acceleration control method.

(3) A third control method is available to control the speed of the carriage by switching the Rush/Hold current. The Rush/Hold current can either be at a Rush current level, referred to as the Rush current, or to a Hold current level, referred to as the Hold current. This control method is used when the speed of the step motor during its acceleration phase is too high, similar to the second control method utilizing time periods Tx and Ty. It is particularly effective where the final speed is low and the overshoot speed is great. Reference is next made to the timing diagram of FIG. 8 which utilizes the acceleration pattern of FIG. 9 to describe the third acceleration control approach. The first acceleration control approach accelerates the step motor until the kth phase change after the carriage motor is started. In FIG. 8 k=3 and the first control method operates during the first three phase changes. Then, the third acceleration control approach is implemented at each phase change from the (k+1)th to the Lth phase change. In FIG. 8 L=9 so that the third control method operates from the fourth through the ninth phase changes in FIG. 8. Thereafter, the first control method again operates until the first dot is printed. The third control method is used where the carriage motor has significantly overshot the desired speed and must be rapidly slowed down to its selected speed without allowing the step motor to step out.

The third control method determines whether the MTS after phase change precedes the predetermined time period tD when the Rush/Hold current is at its Rush level. The Rush current is then applied to the drive phase until the end of a bias time TB starting at the rising edge of the MTS. At that point the Rush current changes to the Hold current and the Hold current is applied to the drive phase until the next phase change. When the Hold current is applied, the torque is substantially zero. Bias time TB is provided to generate torque which insures the continued forward movement of the step motor and the carriage.

When the timing for the next phase change occurs while the Rush level of the Rush/Hold current is still present, the Hold current is not applied, and the first acceleration control method is utilized. As seen in FIG. 8, the period between MTS T6 and T7 is large, indicative of a significant slowing down of the carriage speeds. As a result, the significant speed reduction due to application of the Rush/Hold current when at the Hold level, where substantially no torque is applied, is not necessary. As a result, the first control method is used.

Where after a first MTS is produced a second MTS is also produced during the Hold current application following a time period tD, the Hold current is applied continuously, ignoring the presence of the second MTS. This situation is representative of a state in which the carriage speed is extremely high and a severe reduction in speed is required. After the Lth phase change, the carriage motor is controlled by the first acceleration control approach which is suitable for fine adjustments in speed. The third control method using switching of the levels of the Rush/Hold current is established for predetermined period such as T4–T9 in FIG. 8 because the speed overshoot is known to be a very high during these periods.

Figure 17:
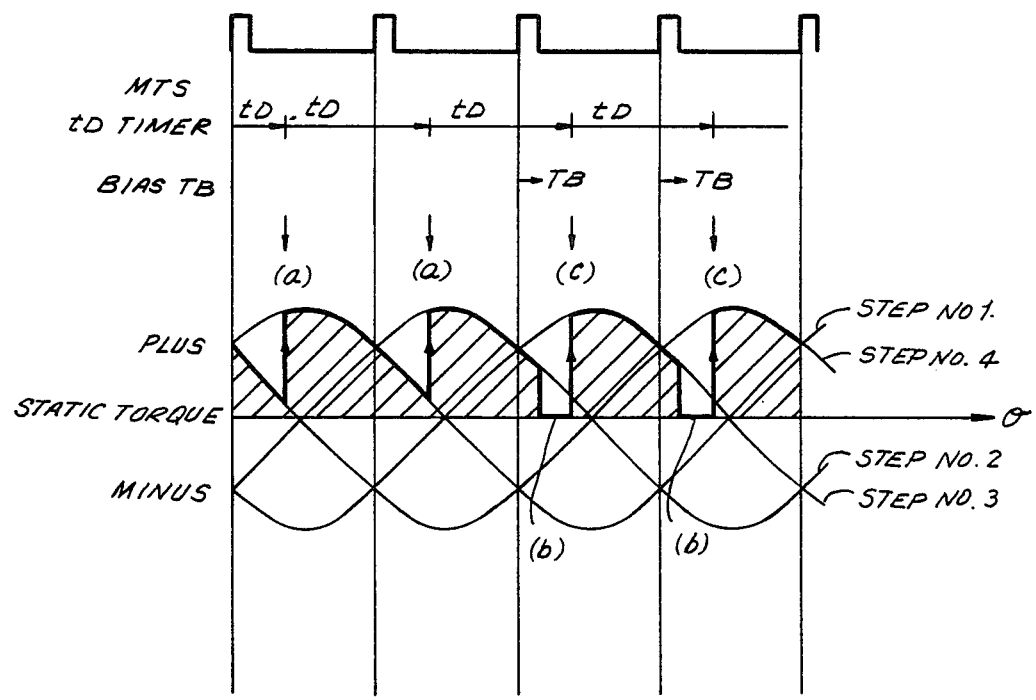

In FIG. 17 the phase is changed at the same positions on the curve at points (a) and (c). However, at points (c) the Rush/Hold current is changed from the Rush level to the Hold level at the end of bias time TB, so that the torque at position (b) can be decreased. In fact, the torque is substantially zero while the Rush/Hold current is at its Hold level.

The reliable acceleration of the carriage from its stopped position to the point at which the first dot is printed with the carriage moving at a selected speed is critical. Using combinations of the three types of acceleration control described above, and the relationship between the torque of the step motor and its rotational speed, high speed and reliable carriage acceleration to the selected speed is achieved.

Each of the three control approaches is useful for specific situations. The first approach, in which the phase is changed upon receipt of the later of the MTS or acceleration data TDn is the basic control. However, when excessive torque is present a combination of the first and second control approaches are used. The second acceleration control approach utilizes the additional predetermined time periods Tx and Ty to reduce torque more rapidly then the basic control approach. However, when the torque is even more significantly above the desirable torque, and the selected printing speed is low, a combination of the first and third control approaches is used. The third control approach, which varies the Rush/Hold current between the Rush and Hold levels provides more severe reductions in torque where the speed is particularly excessive. When the selected speed Nm pps is set for the slowest speed (n=3), the combination of the first and third control approaches is appropriate. The bias time TB is set at a fixed value, which is read out by slave CPU 2 and interrupt timer 53 is set to this time. The switching between the Hold and Rush levels of the Rush/Hold current is controlled by port Pl of slave CPU 2 as shown in FIG. 3.

Constant Speed Control

The first acceleration control approach is used to maintain constant speed control. Constant speed control is used during printing of dots. The speed control is based on the tD data having a constant interval α msec which is substantially equal to interval tD12 of the respective speed tables. The acceleration schedules are set to have the carriage moving at the selected speed at their completion. The constant speed period is set to have a predetermined number of pulses. The carriage maintains constant speed through the printing area. Thereafter, the carriage must be stopped which requires a deceleration control.

Deceleration Control

Figure 14:
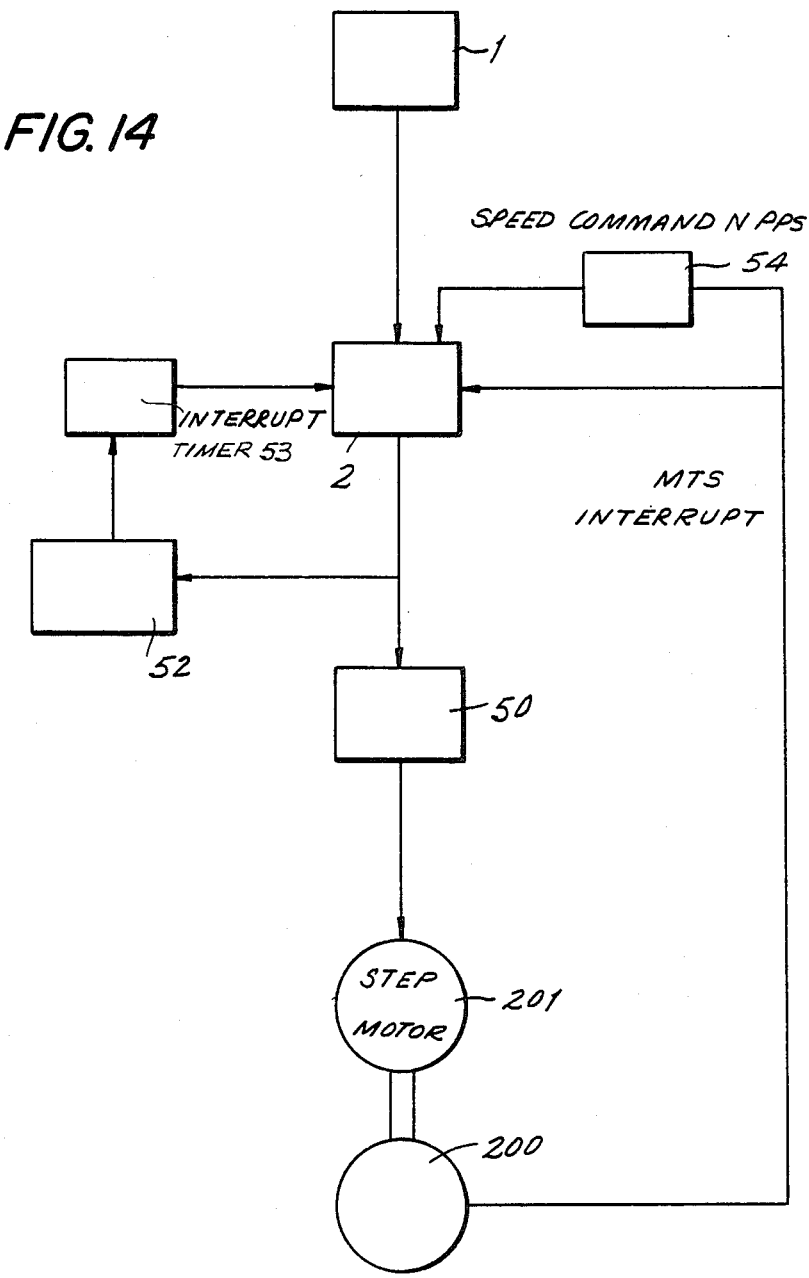
FIG. 14 is a functional block diagram of the manner in which step motor phase changing is accomplished in accordance with the invention.

Deceleration control is used to stop the carriage after passing through the printing area at the selected speed. Ideally, the carriage should stop at the end of the printing area. However, this is not feasible so a minimization of the slow down space is desired. Reference is made to FIG. 14 wherein CPU 2 determines whether or not the MTS precedes the signal generated at constant intervals of α msec.

Figure 10:
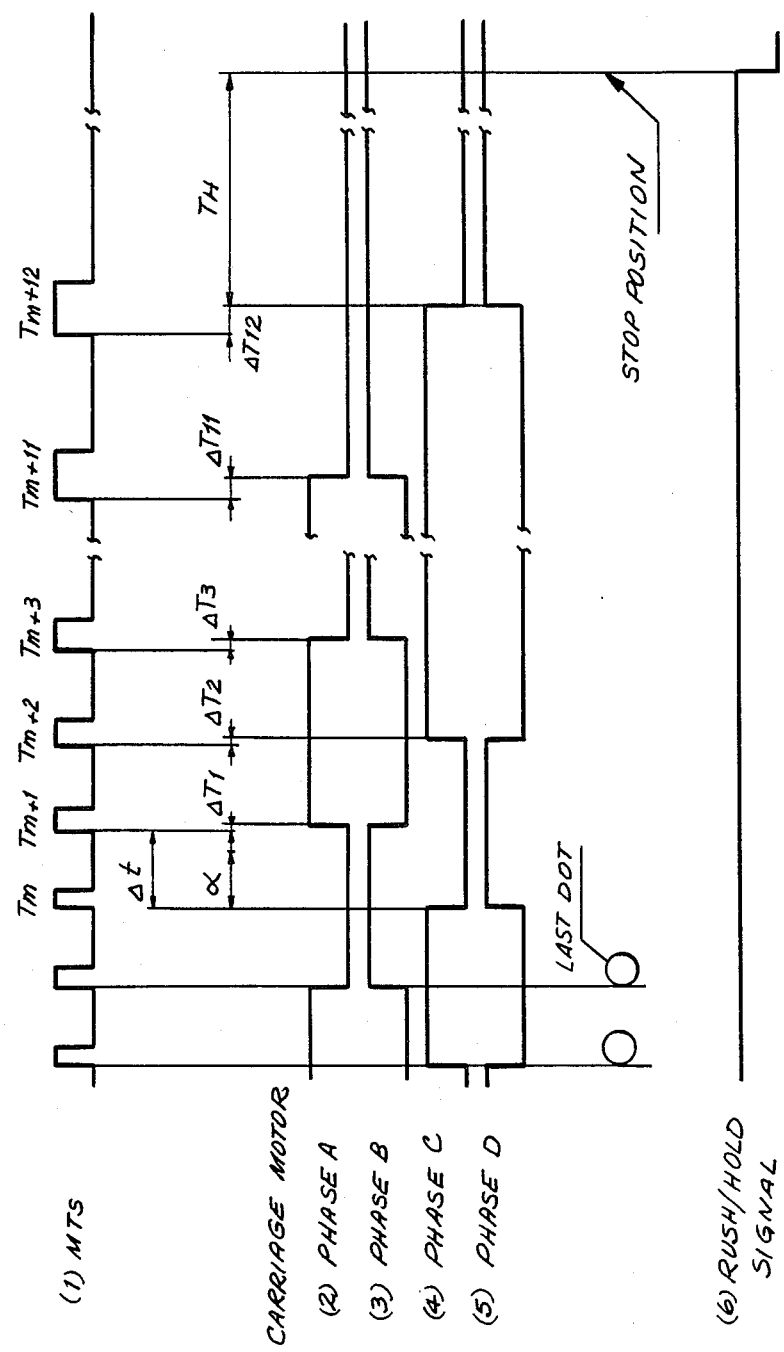
FIG. 10 is a timing diagram showing the deceleration of a step motor by a first deceleration control system in accordance with the invention.

(1) The first deceleration control approach is the basic deceleration approach. Reference is made to FIG. 10 which shows the situation where each interval α precedes the MTS. In this situation the carriage is stopped smoothly and a closed-loop control operates to decelerate the step motor in a step by step manner without the step motor stepping out. This closed-loop control is obtained by changing the step motor phases after the elapse of time ΔTn following the detection of the MTS. As in the predetermined acceleration data in FIG. 9, the ΔTn data is found in a table (FIG. 12) which is used to smoothly stop the carriage. The appropriate column of deceleration data is selected in FIG. 12 dependent upon the speed of the carriage prior to deceleration. As with the acceleration control data there are three different speeds shown in the table of FIG. 12. As a result of changing the phase of the step motor a period ΔTn after the detection of the MTS, the step motor has changed phase sufficiently so that the next MTS which is generated results in the carriage moving forward under power. The period ΔTn after the MTS is provided to prevent the torque from becoming too strong, which would result if the phase change were initiated at the rising of the MTS.

This first deceleration control is appropriate where the carriage is moving slowly and allows the carriage to be brought to a complete stop without causing the motor to step-out.

Figure 11:
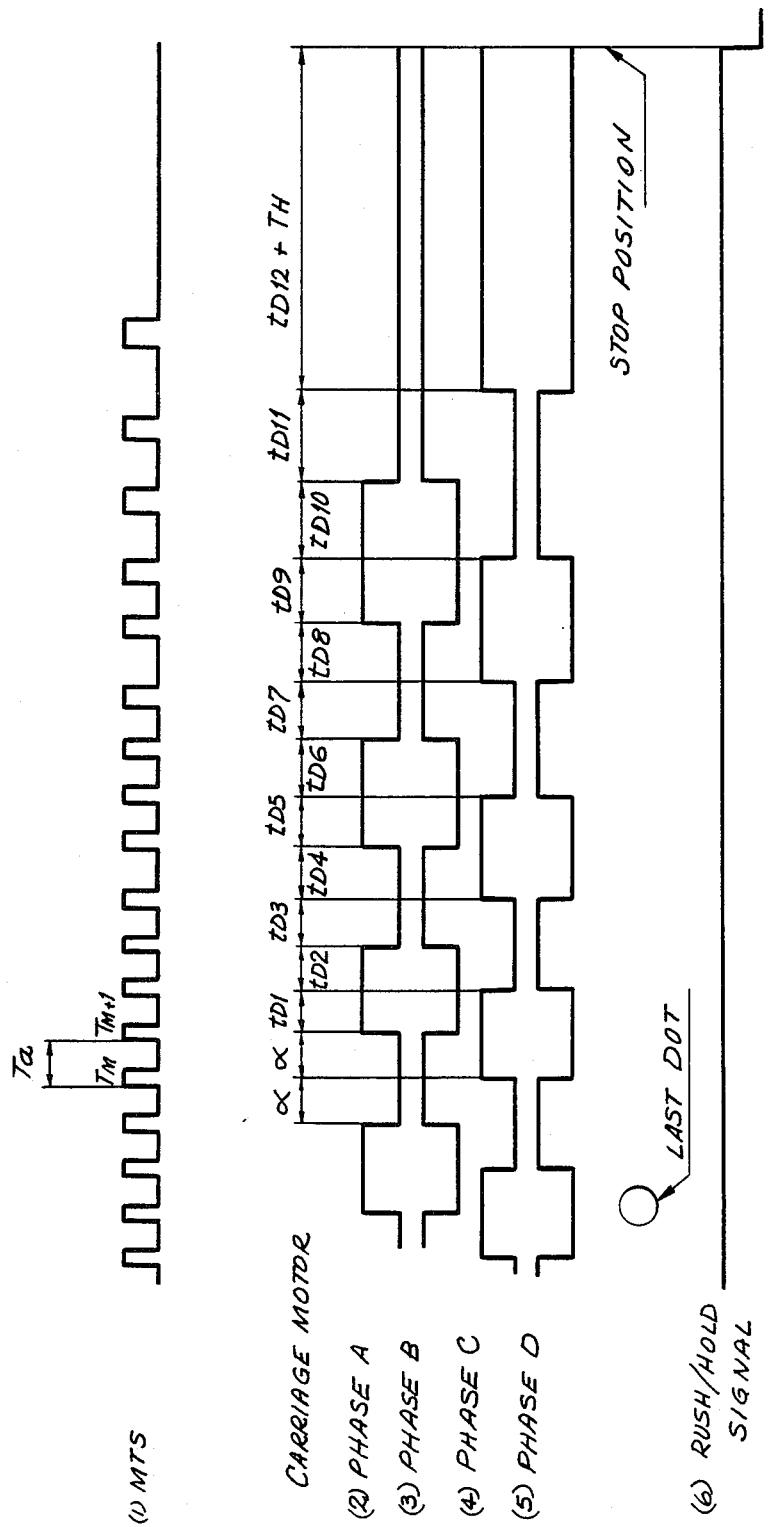
FIG. 11 is a timing diagram showing the deceleration of a step motor by a second deceleration control system in accordance with the invention.

(2) Reference is next made to FIG. 11 wherein a second deceleration control approach is depicted. The second control approach is utilized in the situation where the MTS either precedes or is synchronous with the signal generated for each constant speed interval α. In this situation, a time interval Ta is measured between adjacent MTS signals generated before deceleration control begins. This is the period between MTS signals during printing (constant driving). Timer 53 shown in FIG. 14 is reset each time an MTS is received during acceleration and constant speed control periods so that slave CPU 2 can keep track of interval Ta. Time interval Ta is in turn compared with the period tDn of the open loop control deceleration table shown in FIG. 13. Again, n is an integer between 1 and 12 and the table contemplates a twelve step stopping cycle. The time interval Ta is then compared with deceleration data to tDn of the open-loop control deceleration table shown in FIG. 13. The longer of the two intervals is then used to change the phases of the step motor.

When interval Ta is equal to or shorter than the period tDn the carriage has slowed down enough to decelerate based on the deceleration pattern data of FIG. 13. Therefore, at this point the step motor changes phase based on the deceleration pattern data tDn in accordance with the open-loop control of (2) Reference is next made to FIG. 11 wherein a second deceleration control approach is depicted. The second control approach is utilized in the situation where the MTS either precedes or is synchronous with the signal generated for each constant speed interval α. In this situation, a time interval Ta is measured between adjacent MTS signals generated before deceleration control begins. This is the period between MTS signals during printing (constant driving). Timer 53 shown in FIG. 14 is reset each time an MTS is received during acceleration and constant speed control periods so that slave CPU 2 can keep track of interval Ta. Time interval Ta is in turn compared with the period tDn of the open loop control deceleration table shown in FIG. 13. Again, n is an integer between 1 and 12 and the table contemplates a twelve step stopping cycle. The time interval Ta is then compared with deceleration data to tDn of the open-loop control deceleration table shown in FIG. 13. The longer of the two intervals is then used to change the phases of the step motor.

Figure 18:
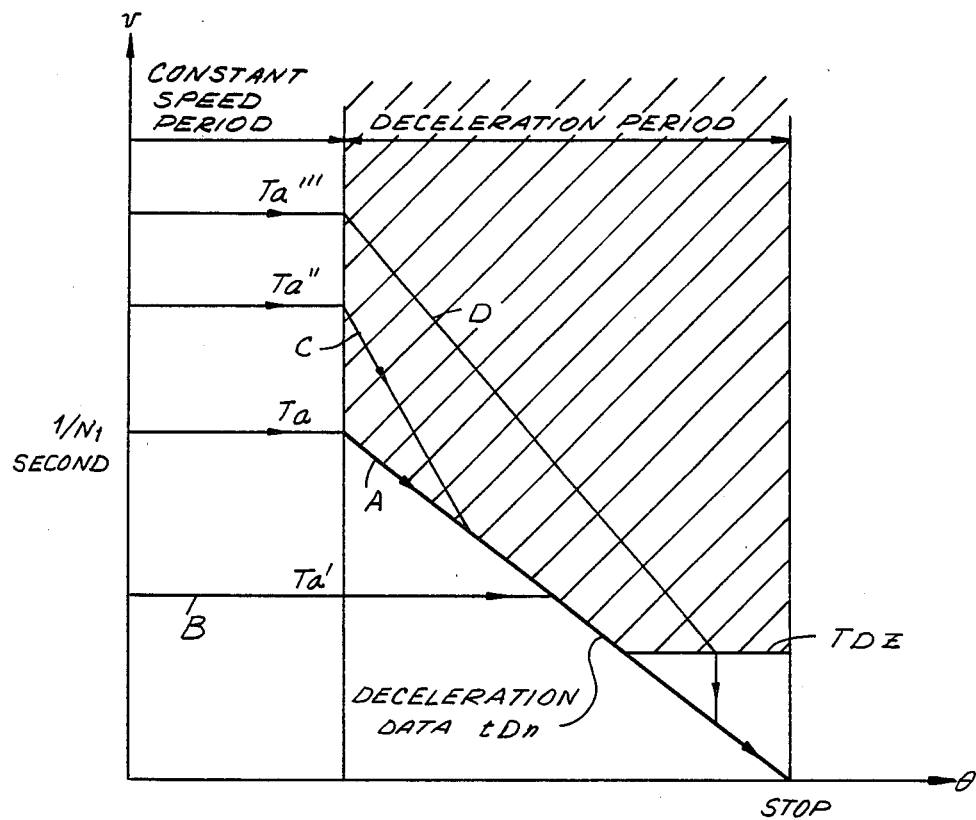
FIG. 18 is a graphical representation showing the relationship between different deceleration patterns.

When interval Ta is equal to or shorter than the period tDn the carriage has slowed down enough to decelerate based on the deceleration pattern data of FIG. 13. Therefore, at this point the step motor changes phase based on the deceleration pattern data tDn in accordance with the open-loop control of the table of FIG. 13. FIG. 18 shows the deceleration curve A which corresponds to the deceleration data of FIG. 13. As the carriage decelerates from a higher speed to intersect with curve A, control shifts over to the deceleration data tDn.

When the interval Ta is longer than the period tDn, the carriage is not moving fast enough to decelerate along curve A and would step out if driven according to the sequence of FIG. 13. As a result, the step motor is driven under an open-loop control using interval Ta as shown by curve B in FIG. 18 until interval Ta' becomes equal to or less than tDn. Then, the deceleration data control of curve A is utilized. Along deceleration pattern B, the interval Ta is compared with the period tDn every time the phase of the step motor changes. Slave CPU 2 determines interval Ta through timer 54. The data read out from tD table 52 is stored in an internal register to make the comparison. This deceleration control approach is useful where the speed of the carriage is either above or below the speed which decelerates smoothly to a stop in accordance with the deceleration pattern data of FIG. 13 shown as curve A in FIG. 18.

(3) Deceleration From High Speed Motor Driving

Curves C and D are representative of situations where the motor speed immediately prior to the start of deceleration (i.e. during the constant speed driving) is very high and Ta is far shorter than tD1, and the first forced phase change based on the deceleration table of FIG. 13 would cause the step motor to step out so that the deceleration control could not be conducted. Therefore, in this case, the deceleration is performed under a closed-loop control by making full use of the negative portions of the static torque curve. Then, when the motor speed is reduced to a speed corresponding to a predetermined data tDn in the deceleration table, the motor is then controlled in accordance with the open-looped control deceleration data and then stopped.

Figure 19:
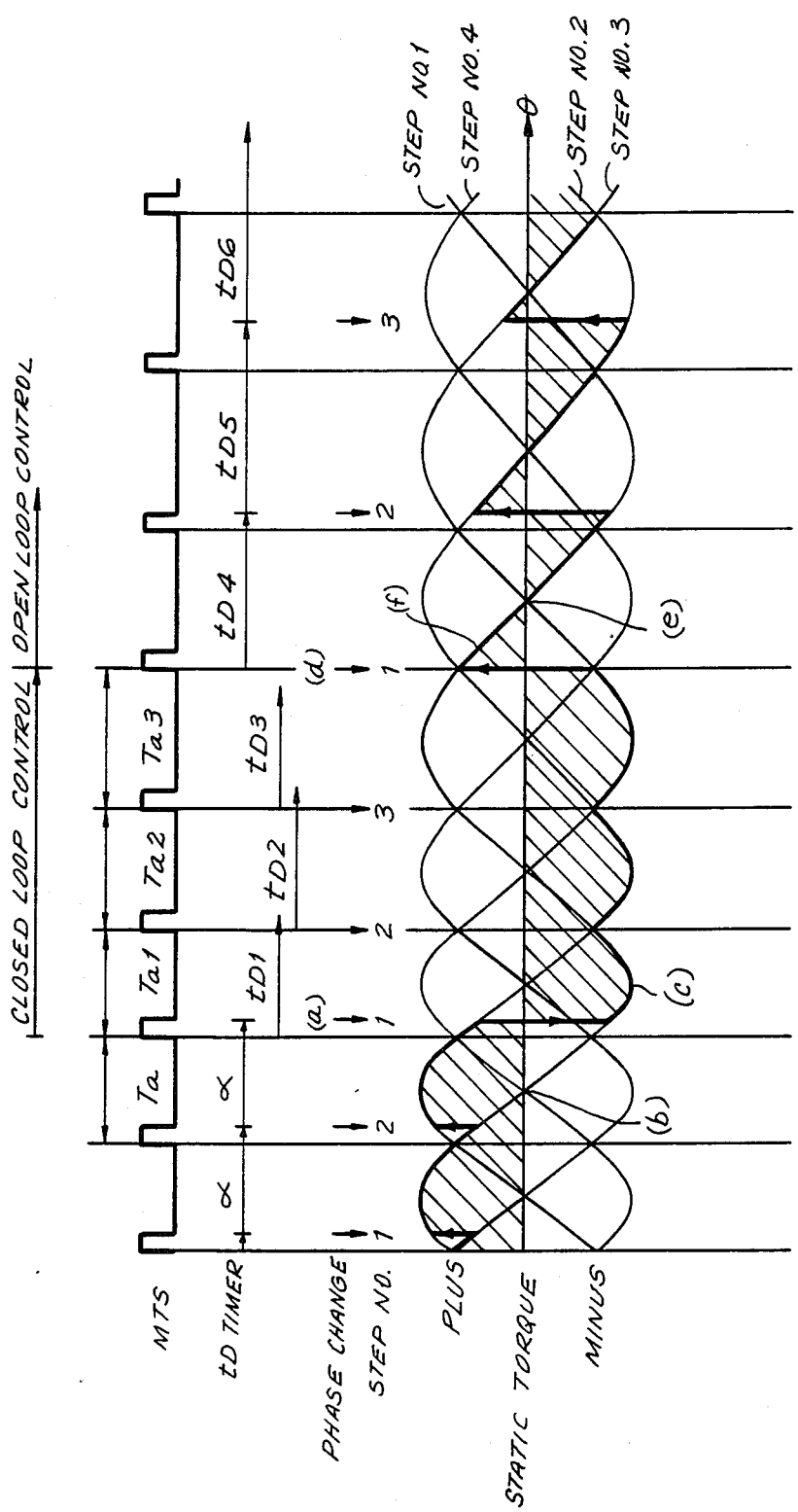
FIG. 19 is a timing diagram showing the relationship between various signals where a step motor is decelerated from an extremely high speed.

Reference is next made to FIG. 19 which exhibits a situation wherein the MTS period Ta immediately proceeding the start of deceleration in significantly shorter than the time period tD1. Slave CPU 2 outputs a phase change command to phase change circuit 50 in synchronism with a signal generated by timer 53 at an interval of α msec. Thereafter, the phase change is conducted at the rising edge of each subsequent MTS signal. Thus, the first phase change is conducted at an interval of α msec and thereafter at each rising edge of the MTS signal. However, the phase change may be performed at every rising edge beginning at the start of deceleration. As shown herein, the step motor is driven as shown by point (a) in FIG. 19 from step number 2 to step number 1, thereby returning to the previous phase state. As a result, the step motor tries to reverse its direction to point (b) which is a stable point in step number 1. However, it continues its forward rotation because of the strong inertia caused by the high speed forward rotation. As a result, a negative torque shown by the hatched portion (c) in FIG. 19 results with the negative torque acting as a brake on the step motor.

Thereafter, CPU 2 counts a MTS period Tan (where n is an integer from 1-12) at each rising edge of the MTS. Tan is the time between the (n-l)th MTS and the nth MTS. Then CPU 2 compares this time period with the deceleration data tDn in the tD deceleration table. In the hatched area of FIG. 18, where Tan is less than tDn and Tan is also less than tDZ, CPU 2 outputs a phase change command on every rising edge of the MTS signal. This thereby generates the maximum torque in the negative direction as shown by the hatched portion (c) in FIG. 19 between points (a) and (d) for maximum deceleration.

The time period tDZ is determined so as to prevent the reverse rotation of the step motor, which could result if the decreasing inertia of the step motor caused by the deceleration reaches zero. Reverse rotation of the step motor will generate an MTS signal in the reverse direction. However, CPU 2 has no way of detecting the direction of the MTS so that the excitation of the next phase as the reverse MTS rises would tDZ is set to a period, such as about 2 msec, which provides a minimum speed of the motor during the negative torque driving period (points (a)-(d)). When Tan ≧ tDn or Tan ≧ tDZ, CPU 2 supplies phase change circuit 50 with a phase change command to skip forward a step. In the embodiment shown in FIG. 19, the phase change skips from step number 3 to step number 1 at point (d) so that the motor receives a positive torque as shown by hatching portion (f). Thereafter, the changing of phases in sequence reverts to the open-loop control based on the tD table 52 until deceleration ends.

In this approach the step motor is susceptible to step out at point (d) in FIG. 19 where the closed-loop control is changed back to the open-loop control. However, as described above, step number 3 is followed by step number 1 at point (d) which has a positive torque. As a result, step motor advances forward towards point (e) which is the nearest stable point in the forward direction, significantly minimizing the risk of fall out. At this point the step motor is moving sufficiently slow so that it may be driven to a stop without step out based on tD table 52 under the open-loop control.

The above embodiment of a control method has been described with reference to a four phase motor using two-two phase excitation. However, the method of controlling the operation is not limited to this specific type of motor and is applicable to a variety of different types of step motors.

Accordingly, an improved control method for reliably and quickly controlling the speed of a printers carriage before and after printing so that the amount of carriage movement required in acceleration and deceleration is greatly reduced. As a result, the width of the carriage can be reduced resulting in an ability to miniaturize the printer.

It will thus be seen that the objects set forth above, among those made apparent from the preceding description, are efficiently attained and, since certain changes may be made in carrying out the above methods and in the construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A carriage acceleration and constant speed control system for a printer which effects printing by moving a print head mounted on a carriage, comprising:
    a step motor for driving said carriage;
    timing means for generating a phase change instruction signal at predetermined intervals;
    encoder means coupled to the step motor for outputting a motor timing signal representative of movement of the step motor, the encoder means being synchronized with the step motor to produce a motor timing signal so that said motor can obtain the maximum rotational torque;
    interrupt means for counting a first time period from a phase change of said step motor and to selectively count a second time period from an occurrence of the motor timing signal within said first time period; and
    control means coupled to the step motor, timing means, encoder means and interrupt means for changing the phase of the step motor in response to the end of the second time period when the motor timing signal is output during the first time period to delay phase change to slow acceleration, whereby overshoot may be avoided.

2. The carriage control system of claim 1 wherein the control means changes the phase of the step motor synchronous with receipt of the later of the motor timing signal and the phase change instruction signal when the motor timing signal is output after the first time period.

3. A carriage acceleration and constant speed control system for a printer which effects printing by moving a print head mounted on a carriage, comprising:
    a step motor for driving said carriage;
    timing means for generating a phase change instruction signal at predetermined intervals;
    encoder means coupled to the step motor for outputting a motor timing signal representative of movement of the step motor, the encoder means being synchronized with the step motor to produce a motor timing signal that allows the step motor to obtain the maximum rotation torque;
    current means for applying an electric current to the step motor at one of a first level and a second level, relatively smaller that the first level; and
    control means for selecting each of the first and second current levels for variable time periods selected to provide a desired average driving current during each step of the step motor in response to the speed of the carriage movement to control acceleration of the step motor and selecting the first level for at least a minimum period to obtain a correction of the carriage speed.

4. The carriage control system of claim 3 wherein the electric current is the Rush/Hold current and the first level is the Rush level and the second level is the Hold level.

5. The carriage control system of claim 3 wherein application of the electric current at the second level produces a torque on the step motor which is substantially zero.

6. The carriage control system of claim 3 wherein the control means applies the electric current at the first level for a period sufficient for a minimum torque required to drive the carriage and then applies the electric current at the second level to the step motor when the control means detects that the motor timing signal is generated before the phase change instruction signal and after the step motor has changed phases.

7. The carriage control system of claim 3 wherein the control means applies the electric current at the first level to the step motor when the phase change instruction signal is generated before the motor timing signal and after the step motor has changed phases.

8. The carriage control system of claim 6 wherein the control means applies the electric current at the first level to the step motor when the phase change instruction signal is generated before the motor timing signal and after the step motor has changed phases.

9. The carriage control system of claim 3 wherein the control means changes the phase of the step motor synchronous with receipt of the later of the motor timing signal and the phase change instruction signal.

10. The carriage control system of claim 6 wherein the control means changes the phase of the step motor synchronous with receipt of the later of the motor timing signal and the phase change instruction signal.

11. The carriage control system of claim 7 wherein the control means changes the phase of the step motor synchronous with receipt of the later of the motor timing signal and the phase change instruction signal.

12. A carriage constant speed and deceleration control system for a printer which effects printing by moving the carriage mounted on a print head, comprising:

a step motor for driving said carriage;

timing means for generating a phase change instruction signal predetermined based on a constant speed control pattern during constant speed control of the step motor, the encoder means being synchronized with the step motor to produce a motor timing signal that allows the step motor to obtain the maximum rotational torque; and control means for driving said step motor at constant speed during a constant speed period and decelerating said step motor to a stop during a deceleration period, said control means changing the phase of the step motor to obtain a positive torque a predetermined time after the motor timing signal when the phase change instruction signal is generated before the last motor timing signal of the constant speed period.

13. The carriage control system of claim 12 wherein the timing means generates a predetermined series of phase change instruction signals at predetermined intervals to stop the step motor without stepping out.

14. A carriage constant speed and deceleration control system for a printer which effects printing by moving the carriage mounted on a print head, comprising:

a step motor for driving said carriage;

timing means for generating a phase change instruction signal at predetermined intervals based on a constant speed control pattern during constant speed control of the step motor;

encoder means coupled to the step motor for outputting a motor timing signal representative of movement of the step motor, the encoder means being synchronized with the step motor to produce a motor timing signal that allows the step motor to obtain the maximum rotational torque; and control means for changing the phases of the step motor at the end of the longer period between motor timing signals during the constant speed period and the period between phase change instruction signals, when the period between phase change instruction signals during constant speed control is equal to or longer than the period prior to the last motor timing signal during the constant speed period.

15. The carriage control system of claim 14 wherein the control means changes the phases of the step motor a predetermined time after the motor timing signal when the period between phase change instruction signals is shorter than the motor timing signals.

16. A carriage constant speed and deceleration control system for a printer which effects printing by moving the carriage mounted on a print head, comprising:

a step motor for driving said carriage;

timing means for generating a phase change instruction signal at predetermined intervals;

encoder means coupled to the step motor for outputting a motor timing signal representative of movement of the step motor, encoder means being synchronized with the step motor to produce a motor timing signal that allows the step motor to obtain the maximum rotational torque; and control means for first changing the phase of the step motor in the reverse direction, the phase of the step motor being changed synchronous with the motor timing signal until the speed of the carriage becomes less than a predetermined speed value and then advancing the step motor forward during at least one phase change in the lower speed condition in accordance with the phase change instruction signal, whereby negative torque results which decelerates the step motor.

17. The carriage control system of claim 16 wherein the control means changes phases of the step motor synchronously with the generation of the phase change instruction signals when the period between motor timing signals is greater than a minimum speed value.

18. The carriage control system of claim 16 wherein the control means advances the step motor two steps forward when the period between motor timing signals is greater than a minimum speed value.

19. A constant speed and deceleration control system for a moveable element driven by a step motor comprising:

timing means for generating a phase change instruction signal at predetermined intervals;

encoder means coupled to the step motor for outputting a motor timing signal representative of movement of the step motor, said encoder means being synchronized with the step motor to produce a motor timing signal that allows the step motor to obtain the maximum rotational torque; and control means for changing the phase of the step motor in the reverse direction, the phase of the step motor being changed synchronous with the motor timing signal until the speed of the movable element becomes less than a predetermined speed value and then advancing the step motor forward during at least one phase change in the lower speed condition in accordance with the phase change instruction signal, whereby negative torque results which decelerates the step motor.

* * * * *